May 31, 1960  W. H. BRIGGS  2,938,399
HYDRAULICALLY OPERATED VEHICLE STEERING MECHANISMS
Filed April 21, 1958  2 Sheets-Sheet 1
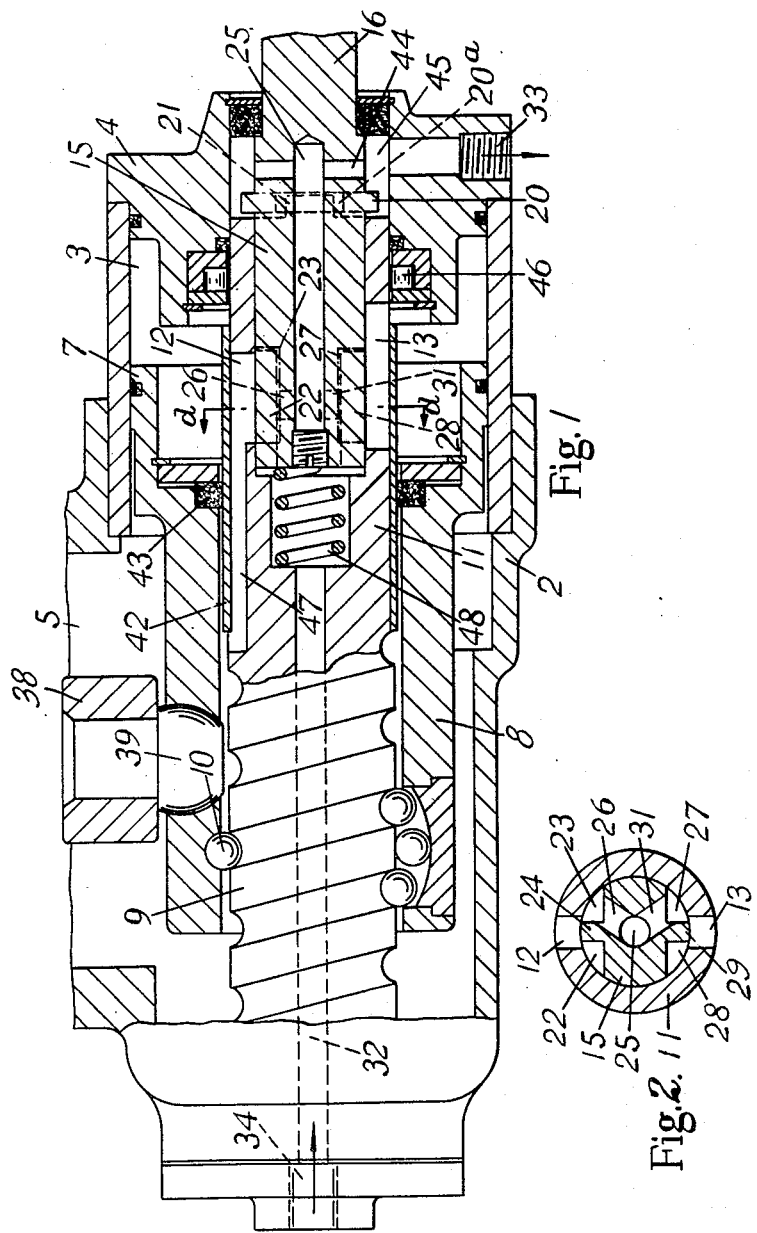
Inventor
W. H. Briggs
By Glascoct Downing Seebold
Attys.

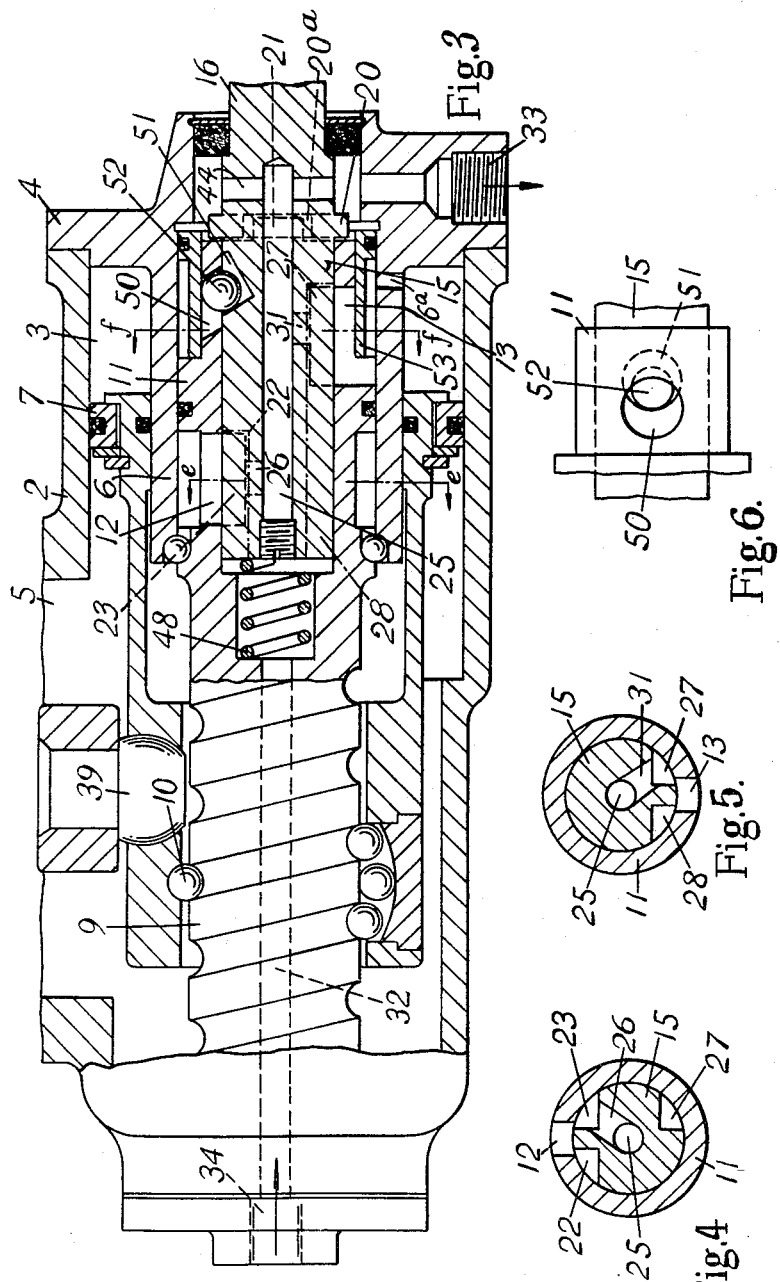

United States Patent Office

2,938,399
Patented May 31, 1960

2,938,399

HYDRAULICALLY OPERATED VEHICLE STEERING MECHANISMS

Walter Henry Briggs, Northfield, Birmingham, England, assignor to Burman & Sons Limited, Birmingham, England Filed Apr. 21, 1958, Ser. No. 729,593

Claims priority, application Great Britain May 1, 1957

2 Claims. (Cl. 74—388)

This invention relates to vehicle steering mechanism of the kind having combined therewith hydraulic actuating means under the control of the driver, the object of the invention being to enable such a mechanism to be provided in a compact form.

A steering mechanism in accordance with the invention comprises in combination a housing, a cylinder forming a part of the housing, an annular piston slidable in the cylinder, an inlet and an outlet for motive liquid by which the piston is movable, an axially disposed rotatable member provided at one end with a laterally ported valve sleeve, a trunk extending from one side of the piston, and having a helical connection with the axially disposed rotatable member, a pivotal arm in engagement with and movable by the trunk, a cylindrical control valve situated within and capable of angular and axial movements relative to the valve sleeve for controlling communication between the ends of the cylinder and the motive liquid inlet and outlet, one end of the valve being exposed to the pressure of motive liquid from the inlet, a spring acting on the said end of the valve, a driver-operable spindle rigid with the valve, and an interconnecting ball occupying a pair of holes formed respectively in the valve and sleeve at an inclination to the axis thereof so that angular movement of the valve by the driver-operable spindle is accompanied by axial movement of the valve against the pressure exerted on the said end thereof by the spring and motive liquid, which pressure serves in conjunction with the ball to return the valve to its initial position when the driver-operable spindle is released.

In the accompanying drawings, Figure 1 is a sectional side elevational and Figure 2 a cross section of the valve and its sleeve on the line d—d, of Figure 1.

Figure 3 is a sectional side elevation illustrating a modification of the invention, and Figures 4 and 5 are cross sections of the valve and sleeve on the lines e—e, f—f, of Figure 3.

Figure 6 is a fragmentary view illustrating the means for centralising the valve in the constructions shown in Figures 1 and 3.

In the embodiment of the invention illustrated by Figures 1 and 2, a part of the housing 2 of the mechanism includes a cylinder 3 which at one end is closed by a cover 4, the other end being open to a chamber 5 in another part of the housing. The cylinder 3 contains an annular piston 7. On one side of the piston is formed a hollow cylindrical trunk 8 which extends into the said chamber 5 in the housing. The end of the trunk remote from the piston has formed in it an axial bore through which passes a rotatable member 9 in screw thread or equivalent connection with the trunk. In the example illustrated the said connection consists of a ring of balls 10 engaging and circulating around helical grooves in the trunk 8 and member 9. On the end of the member 9 adjacent the cover 4 is formed a hollow cylindrical extension 11 serving as a valve sleeve and having a lateral port 12 at one side and another lateral port 13 at its opposite side. On the sleeve 11 is tightly mounted another sleeve 42. The annular piston 7 is supported at its outer periphery by the cylinder 3, and is provided at its inner periphery with a sealing ring 43 which embraces the sleeve 42.

The valve sleeve 11 is supported at the end adjacent the cover 4 by a roller bearing 46, and between this bearing and the adjacent end of the sleeve 42 is a gap through which motive liquid can flow.

In the sleeve 11 is contained a cylindrical valve 15 which is formed on or secured to one end of the driver-operable spindle 16.

The valve is capable of an initial angular movement in either direction from its central or neutral position, when the driver's spindle is actuated. Also on the valve is formed a collar 20 having notches 20a in its periphery for engagement by teeth as 21 on the adjacent end of the valve sleeve 11, for transmitting continued movement from the valve to the sleeve by actuation of the driver's spindle, a sufficient lost motion being provided between the teeth and notches to permit the required preliminary movement of the valve relatively to the sleeve. The valve also has a small amount of endwise freedom, and is adapted to be held in its neutral position as hereinafter described by a device illustrated in Figures 3 and 6, under an endwise force exerted on the valve by a spring 48 and the pressure of the motive liquid.

On one side of the peripheral surface of the valve are formed two grooves 22, 23, having between them a longitudinal rib 24 of less width than the port 12. The groove 23 is a short one having about the same length as the port 12. The groove 22 is of greater length than the port 12 and extends and is open to the left hand end of the valve. The groove 23 communicates with an axial bore 25 in the valve through a radial passage 26. Also on the peripheral surface of the valve and at the opposite side to the grooves 22, 23, are formed two other grooves 27, 28, having between them a rib 29 which is of less width than the port 13. The groove 27 is of about the same length as the port 13. The groove 28 is longer than the groove 27 and extends and is open to the left hand end of the valve. The groove 27 communicates with the axial bore 25 through a radial passage 31.

Another axial bore 32 extends along the member 9 to a motive liquid inlet 34 in the housing. A motive liquid outlet 33 is provided on the end cover 4, and communicates with the axial bore 25 through radial ports 44 in the valve, and an annular space 45 surrounding these ports.

The motive liquid is supplied by a pump connected to the said inlet and outlet on the housing of the mechanism. When the valve is in its neutral position as shown in Figure 2 the liquid can flow idly through the mechanism from the inlet 34 to the outlet 33 via the axial bore 32, the grooves 22, 28, the ports 12, 13, the grooves 23, 27, the passages 26, 31, the axial bore 25, and the ports 44.

On moving the valve in the clockwise direction, the longer groove 22 is moved into coincidence with the port 12, and the shorter groove 27 is moved into coincidence with the port 13. The motive liquid then flows from the inlet 34 through the axial bore 32, the groove 22, the port 12, and the passage 47, to the left hand side of the piston 7 (Figure 1), causing the piston to move to the right. Meanwhile liquid displaced from the right hand side of the piston enters the port 13 and passes through the groove 27 and passage 31 to the axial bore 25 and thence through the ports 44 to the outlet 33.

On moving the valve in the anti-clockwise direction, the shorter groove 23 is moved into coincidence with the port 12, and the long groove 28 is moved into coincidence with the port 13. The motive liquid then passes from the axial bore 32 through the groove 28 and the port 13 to the right hand side of the piston, causing the latter to move to the left. Meanwhile the liquid displaced from the left hand side of the piston passes through the port 12, the groove 23, the passage 26, the valve bore 25, and the ports 44 to the outlet 33.

For transmitting the movement of the piston to the steerable road wheels, there is combined with the mechanism a rocker shaft (not shown) which is supported by a bearing formed on the housing, the axis of this shaft being contained in a plane parallel with the plane containing the axis of the piston, and the axes of the shaft and piston being at right angles to each other. On the rocker shaft is formed or secured a radial arm 38 having adjacent to its free end, a lateral projection 39 which occupies a recess in one side of the piston trunk 8. Motion imparted to this arm by the piston is transmitted through the rocker shaft to a drop arm on the shaft, and thence in the usual manner to the linkage associated with the steerable road wheels.

In the event of failure of the hydraulic mechanism, the driver can effect the desired steering actions directly, as the teeth 21 on the sleeve 11 can then serve to interlock the driver's spindle and the member 9.

The construction illustrated by Figures 3 to 6 of the drawings is also essentially similar to that shown in Figure 1, but differs in that the sleeve 42 is omitted, and instead, the end cover 4 has formed thereon an inwardly extending hollow boss 6 having therein ports as 6a through which the motive liquid can flow to and from the right hand side of the piston 7, the latter being situated in an annular space between the boss and the inner periphery of the cylinder. The arrangement of the passages for the motive liquid is essentially similar to that of Figure 1, and the description of these passages with reference to Figure 1 applies also to the construction shown in Figure 3, corresponding parts being identified by corresponding reference numerals.

For controlling the neutral position of the valve, there are formed in the sleeve 11 and valve 15 respectively a hole 50 and a blind hole 51, the axes of these holes being inclined to the axis of the valve. In these holes is placed a ball 52 of smaller diameter than the holes. The ball is supported by contact with one side of the hole 51 and by contact with the opposite side of the hole 50. The ball is held in position by a ring 53. By the action of the spring 48 on the valve, and also the pressure of the motive liquid on the left hand end of the valve, the ball effectively holds the valve in its neutral position and returns it to this position after angular movement of the valve in the sleeve in either direction from the said position. When an angular movement is given to the valve, the interaction of the ball and the edges of the holes causes a small axial movement to be given to the valve, and this is accommodated by the spring. As already mentioned this device is also employed in the construction shown in Figure 1. A plan view of the device is shown in Figure 6.

Having thus described my invention what I claim as new and desire to secure by Letters Patent is:

1. A hydraulically operable vehicle steering mechanism comprising in combination a housing, a cylinder forming a part of the housing, an annular piston slidable in the cylinder, an inlet and an outlet for motive liquid by which the piston is movable, an axially disposed rotatable member provided at one end with a laterally ported valve sleeve, a trunk extending from one side of the piston, and having a helical connection with the axially disposed rotatable member, a pivotal arm in engagement with and movable by the trunk, a cylindrical control valve situated within and capable of angular and axial movements relative to the valve sleeve for controlling communication between the ends of the cylinders and the motive liquid inlet and outlet, one end of the valve being exposed to the pressure of the motive liquid from the inlet, a spring acting on the said end of the valve, a driver-operable spindle rigid with the valve, and an interconnecting ball occupying a pair of holes provided respectively in the valve and sleeve at an inclination to the axis thereof so that angular movement of the valve by the driver-operable spindle is accompanied by axial movement of the valve against the pressure exerted on the said end thereof by the spring and the motive liquid, which pressure serves in conjunction with the ball to return the valve to its initial position when the driver-operable spindle is released.

2. A hydraulically operable vehicle steering mechanism according to claim 1, and having a second sleeve tightly mounted on the laterally ported valve sleeve to direct the motive liquid to and from the ends of the cylinder.

References Cited in the file of this patent

UNITED STATES PATENTS

| | | |
|---|---|---|
| 1,937,485 | Davis | Nov. 28, 1933 |
| 1,959,177 | Sassen | May 15, 1934 |
| 2,722,199 | Blanchette | Nov. 1, 1955 |
| 2,755,778 | Looflourrow et al. | July 24, 1956 |
| 2,788,770 | Folkerts | Apr. 16, 1957 |

FOREIGN PATENTS

| | | |
|---|---|---|
| 354,327 | Great Britain | Aug. 4, 1931 |